Sept. 10, 1940.   C. A. KELLER ET AL   2,214,302
ADJUSTABLE SIGN HOLDER
Filed July 11, 1939
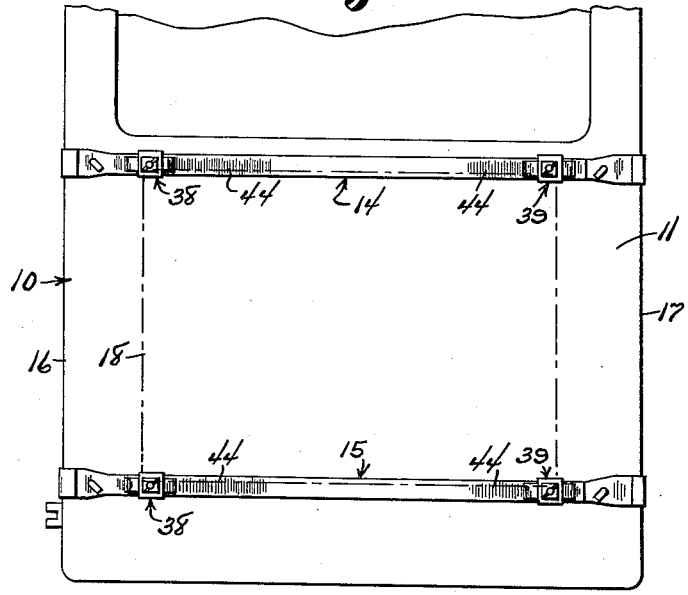
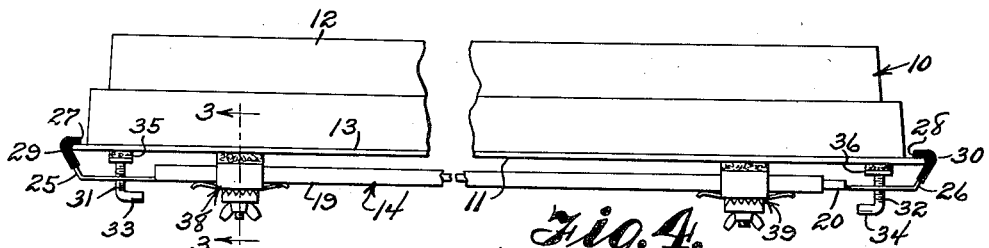
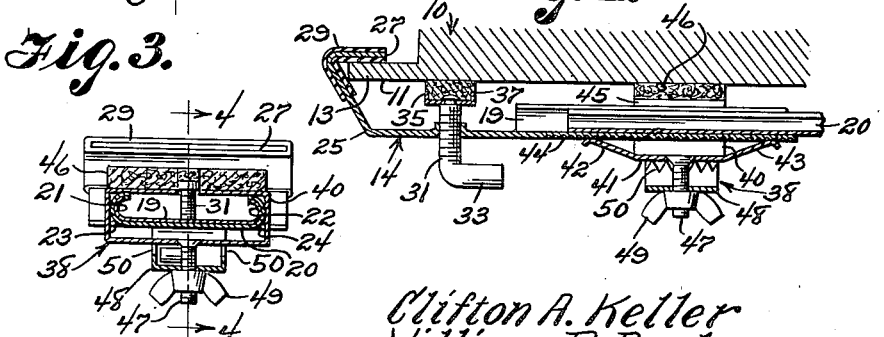
Clifton A. Keller
William R. Doyle   INVENTORS
BY Victor J. Evans & Co.

Patented Sept. 10, 1940

2,214,302

UNITED STATES PATENT OFFICE 2,214,302

ADJUSTABLE SIGN HOLDER

Clifton A. Keller and William R. Doyle,
Louisville, Ky.

Application July 11, 1939, Serial No. 283,894

4 Claims. (Cl. 40—129)

Our invention relates to a device for advantageously supporting a placard, from a vehicle door.

An important object of our invention is to provide a means for fixedly supporting a placard, having an advertising legend thereon, from the door of a vehicle.

Another object of our invention is to provide an apparatus that may be detachably mounted to the door of a vehicle and that includes adjustable clamp means to securely hold varying sizes of signs.

Still another object of our invention is to provide an apparatus that may be detachably mounted to the door of a vehicle, but that will not mar or scratch the finished surface of the same.

Yet another object of our invention is to provide a means for supporting advertising placards, or the like, from the door of a vehicle and that will in no way interfere with the free movement of the said door.

A further object of our invention is to provide an apparatus for supporting an advertising placard, or the like, from the door of a vehicle that is simple in construction, efficient in operation, and inexpensive to manufacture.

Other objects and advantages of our invention will be apparent during the course of the following description.

In the drawing, forming a part of this specification, and in which like numerals are employed to designate like parts throughout the same, Figure 1 is a fragmentary front elevation of a vehicle door, and illustrating our invention in association therewith, Figure 2 is an enlarged top plan view thereof, Figure 3 is a vertical sectional view taken on the line 3—3 of Figure 2, and Figure 4 is a transverse sectional view taken on the line 4—4 of Figure 3.

In the accompanying drawing, wherein for the purpose of illustration is shown a preferred embodiment of my invention, the numeral 10 designates the door of an automobile vehicle, of conventional shape and construction, having a finished outer panel 11 which extends beyond the main body portion 12 to define the peripheral rim 13.

In practicing our invention the spaced bands 14 and 15 engage the longitudinal sides 16 and 17 of the panel 11 and include means to securely hold the placard or the like 18 therebetween.

The band 14 comprises cooperative telescoping sections 19 and 20. The section 19 has the sides 21 and 22 thereof curved upwardly and inwardly to embracingly receive the curved sides 23 and 24 of the section 20. The ends 25 and 26 of the sections are bent obliquely inwardly and the extremities 27 and 28 thereof are bent inwardly in spaced parallel relation to the main body of the said portions in a manner to engage the rear face of the peripheral rim 13. The protecting sleeves 29 and 30 of rubber, or the like, are carried by the extremities 27 and 28 to prevent the finish at the edge of the door from being scratched or marred. The sections 19 and 20 are punched and tapped to threadedly receive the bolts 31 and 32. The outer ends of the bolts are formed with laterally extending handles 33 and 34, and the inner ends thereof are provided with caps 35 and 36 the bottom portions of which are covered with a protecting material 37 of felt, or the like.

It may be seen that the sections 19 and 20 of the band 14 may be telescopically adjusted to properly accommodate the vehicle door, and that when properly adjusted, the extremities 27 and 28 of the sections will embrace the rim 13 of the door, and when the bolts 31 and 32 are threaded inwardly with the felt material 37 in appressed relation with the outer face of the panel 11, the portions 19 and 20 will be flexed outwardly to hold the extremities 27 and 28 in close frictional engagement of the inner face of the rim 13.

Adjustable clamps 38 and 39 are slidably carried by the band 14 and include sleeves 40 of substantially greater depth than the said sections and formed at their outer sides 41 with laterally extending resilient arms 42 and 43 the ends of which frictionally engage the corrugated outer surface 44 of the sections 19 and 20. The inner portion 45 of the sleeves are provided with a protective covering 46 of felt, or the like, to obviate any possibility of the metallic parts of the sleeves contacting and marring the finish on the outer surface of the door. The threaded bolts 47 project outwardly from substantially the center of the outer side 41 of the sleeves 40 and clamps 48 are held thereon in close frictional engagement therewith by the wing nuts 49. The clamps 48 are substantially U-shaped in their formation and are provided with serrated edges 50 adapted to firmly engage the outer surface of the placard 18.

The bands 14 and 15 are identical in their construction and it is therefore believed that a detail description of but one of these is sufficient.

In practicing our invention, the bands 14 and 15 are positioned a suitable distance apart on the door 11 in a manner to accommodate the placard 18, and the clamps 38 and 39 thereon are slidably adjusted relative thereto to receive the vertical edges of the placard. When the wing nuts 49 are threaded outwardly on the bolts 47 the edges of the placard may be inserted between the outer sides 41 of the sleeves and the serrated teeth 50 of the U-shaped clamps 48, so that when the wing nuts 49 are threaded inwardly on the bolts 47 the teeth 50 of the clamps 48 will bite into the outer surface of the placard to hold the same against accidental displacement.

It may thus be seen that the device may be easily and expeditiously attached to or removed from the door of the vehicle, that there will be no danger of marring or scratching the finish of the door when the device is attached thereto, and that the apparatus will in no way interfere with the free opening and closing movement of the door.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described our invention, we claim:

1. A sign holder for automotive vehicles comprising a pair of cooperating members having channel portions telescoping one within the other and having free ends curved to engage the edges of the door of the vehicle, clamp means carried by the said members and engageable with the outer surface of the door, and clamp means slidably carried by the said members and adapted to receive the edge of a placard.

2. A sign holder for automotive vehicles comprising a pair of cooperating members having channel portions telescoping one within the other and having free ends hooked to engage the longitudinal edges of the door of the vehicle, threaded bolts carried by the said members and adapted to engage the outer surface of the door to flex the said members in a direction away from the door and to hold the hooked ends thereof in close frictional engagement with the door, and clamp means slidably carried by the members to detachably receive and grip the edge of a placard.

3. A sign holder for automotive vehicles comprising a pair of cooperating members having channel portions telescoping one within the other and having free ends curved to engage the edges of the door of the vehicle, clamp means carried by the said members and engageable with the outer surface of the door, clamp means slidably carried by the said members to receive and grip the edge of a placard, and pads carried by the door engaging portions of each of the said clamp means to prevent the marring or scratching of the door.

4. A sign holder for automotive vehicles comprising cooperating members having channel portions telescoping one within the other, said members having a corrugated outer surface and with the free ends thereof hooked to engage the longitudinal edges of the said door of the vehicle, threaded bolts carried by the members and adapted to engage the outer surface of the door to flex the said members in a direction away from the door and to hold the hooked ends thereof in close frictional engagement with the door, sleeves slidably carried by the said channel members and including resilient arms adapted to frictionally engage the corrugated outer surface thereof, and clamp means carried by the said sleeves to grip the edge of a placard.

CLIFTON A. KELLER.
WILLIAM R. DOYLE.